United States Patent Office 2,985,635
Patented May 23, 1961

2,985,635
REACTION PRODUCTS OF CYCLOPENTADIENE AND TRICHLOROACETIC ACID
Albert Wassermann, 21 Bloomfield Road, London, England
No Drawing. Filed Dec. 23, 1957, Ser. No. 704,273
Claims priority, application Great Britain Jan. 15, 1957
16 Claims. (Cl. 260—89.1)

This invention relates to a novel and useful chemical product and to a process for its production. More specifically it is concerned with a polymerizable reaction product of trichloroacetic acid and cyclopentadiene, the alcohol and polymer formed therefrom, and the processes of preparing such compounds.

It is an object of the present invention to provide a novel and useful ester by the reaction of trichloroacetic acid and cyclopentadiene.

Another object is to prepare a novel and useful alcohol by hydrolysis, and a novel and useful compound of high molecular weight, by polymerization of the ester formed by reaction of trichloroacetic acid and cyclopentadiene.

A further object is to provide a process for producing the products identified above.

These and other objects will become available in the course of the following specification and claims.

In accordance with the present invention, a novel and useful compound is provided having the formula:

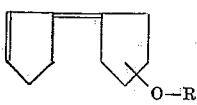

wherein —R is a member of the class consisting of —H and

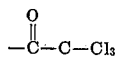

Thus, the formula encompasses the compounds referred to hereinafter as "the alcohol," i.e. hydroxy-dihydro-dicyclopentadiene (where —R is "—H") and "the ester" i.e. the trichloroacetic acid ester of hydroxy-dihydro-dicyclopentadiene

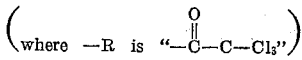

As will be apparent from a consideration of the formula, each compound contains two double bonds. The alcohol is, therefore, to be distinguished from hydroxy-dihydro-endo- or exo-dicyclopentadiene which contains but one double bond and corresponds to the formula:

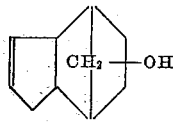

The ester is prepared by mixing cyclopentadiene with trichloroacetic acid in an aprotic solvent while maintaining the molarity of the reaction mixture with respect to cyclopentadiene at no greater than about 2 gram mols per liter and the initial molarity of the reaction mixture with respect to trichloroacetic acid no less than about 0.25 gram mol per liter, and interrupting the reaction between the reactants when no more than about 65% of the cyclopentadiene has been consumed. Preferably the initial molarity of the reaction mixture with respect to each reactant is within the limits of from about 0.5 gram mol per liter to about 1 gram mol per liter. The reaction is interrupted by addition of a proton acceptor to the system. Preferably the proton acceptor is added when from about 30% to about 60% of the cyclopentadiene has been consumed. Failure to maintain the reaction system within the concentration limits defined and/or failure to interrupt the reaction as specified above, renders the ester evanescent, due to the formation of dicyclopentadiene (if the acid concentration is too low) or (if the acid concentration is too high or the reaction time too long) due to polymerization. This polymerization is catalyzed by the presence of the trichloroacetic acid, the resulting polymer being highly colored (soluble in benzene and carbon tetrachloride) as disclosed in United States Patent 2,692,254 to Wassermann dated October 19, 1954.

While the ester forming reaction may occur in the presence of air at atmospheric pressure, under these conditions prolonged contact of the solutions with air should be avoided. It is sometimes useful to blanket the system with inert gas or to operate under reduced pressure, i.e. a partial pressure of air not greater than about 2 mm. mercury. Prolonged contact of the ester product with molecular oxygen results in formation of a colorless polymer as will be illustrated in the examples. Obviously prolonged contact of the ester with substantial amounts of molecular oxygen must also be avoided during hydrolysis to the alcohol.

The following examples are cited to illustrate the invention. They are not intended to limit it in any manner. Wherever used in the examples, the term "parts" signifies "parts by weight."

EXAMPLE I 5.49 parts (0.974 gr. mol/liter) of trichloroacetic acid, 43.6 parts of carbon tetrachloride and 2.85 parts (1.25 gr. mols/liter) of cyclopentadiene are freed from dissolved molecular oxygen by being mixed in a vacuum (i.e. below 2 mm. mercury) at a temperature of 25° C. After a reaction time of 50 minutes, 2.7 parts of pyridine (proton acceptor) are added, thereby interrupting the reaction when 40% of the cyclopentadiene charged to the system is consumed. At this point of the reaction, less than about 10% of the cyclopentadiene has been converted to the intensely colored polymer described and claimed in United States Patent 2,692,254. Since the polymer of the patent has a high electrical conductivity and is highly colored, the limit of "about 10%" is confirmed by noting that the specific conductivity of the solution at 25° C. is not substantially in excess of $10^{-8}$ ohms$^{-1}$ cm.$^{-1}$ and that the optical density of the solution, for light of wavelength 625 m$\mu$ and for an optical pathlength of 0.1 cm. is not substantially in excess of 4. The 6.1 parts of pyridinium trichloroacetate that precipitates is filtered off. The filtrate is free from cyclo- -pentadiene, pyridine and carbon tetrachloride, by distillation at a pressure of 2 mm. mercury and at a temperature not exceeding 30° C. 1.72 parts of ester is obtained.

Upon repetition of the above, except that after addition of the proton acceptor, the vacuum is broken and air at room temperature is bubbled through the reaction mass for about 2 hours, a colorless, apparently cross-linked polymer having an average molecular weight of about $10^6$–$10^7$, is formed.

1 part of the "ester" is stored for about 8 days at 20° in a steel container. The "ester" is completely converted into a novel polymer which forms on the inner walls of the container. The polymer is a deeply colored shiny, strongly adherent film, resistant to heat and completely insoluble in acids, bases or common organic solvents such as benzene and carbon tetrachloride. When the "ester" is stored in tin, copper, silver, platinum, glass or porcelain containers similar polymers are formed. Thus the polymer is useful as a solvent resistant coating.

EXAMPLE II 54 parts dry trichloroacetic acid (0.63 gr. mol/liter) are dissolved in 360 parts dry benzene. To the solution are added 40 parts freshly distilled cyclopentadiene (1.16 gr. mols/liter), dried over anhydrous sodium sulphate. The solution, protected from atmospheric moisture, is left at 25° C., this temperature being maintained by occasional cooling to dissipate the reaction heat. After 60 minutes' interaction, 60% of the cyclopentadiene having been converted into the ester as shown by the dark blue, almost black coloration (owing to some consecutive polymerization of the ester), 50 parts of solid finely powdered potassium bicarbonate (proton acceptor) are added. The suspension is left, with occasional agitation for 2 hours at room temperature (i.e. 20–25° C). Carbon dioxide evolution indicates that the trichloroacetic acid, which had not reacted with the cyclopentadiene is converted, by the bicarbonate, into potassium trichloroacetate, which is substantially insoluble in the solvent used. As the trichloroacetic acid is thus removed, the color of the solution changes from dark blue or black to light yellow. When the carbon dioxide evolution has stopped, the mixture of potassium trichloroacetate and potassium bicarbonate is filtered off and washed with benzene. The filtrate and the washings are distilled in vacuo, at a temperature below 40° C., in a stream of nitrogen, until all solvent is removed. The final stage of this distillation is done at 0.5 mm. mercury. The distillation residue is thus the ester, substantially pure; the yield is 50 parts or 90% of the theoretical quantity.

When a solution containing 15 parts of the above "ester" in 85 parts of benzene is mixed with 16 parts of trichloroacetic acid for 1300 minutes at 25° C., it becomes deep blue, almost black with a light absorption having two maxima, at 470 and 625 m$\mu$, and a specific electrical conductance, at 25° C., of $6 \times 10^{-7}$ ohms$^{-1} \times$cm.$^{-1}$. Analysis indicates that the "ester" is completely converted into a deeply colored polymer of properties identical with those of the polymer described in Example I of United States Patent 2,692,254 to Wassermann, dated October 19, 1954. An identical polymeric product whose solution is characterized by light absorption maxima at 470 and 620 m$\mu$ and specific electrical conductance at 25° C. of $1.4 \times 10^{-6}$ ohms$^{-1}$cm.$^{-1}$, is obtained when 160 parts of trichloroacetic acid is substituted for the 16 parts recited above and the contact period is reduced to 300 minutes.

EXAMPLE III

A solution containing 35 parts (1.18 gr. mols/liter) of cyclopentadiene, in 200 parts of benzene, is slowly added, in air at atmospheric pressure and with stirring, to a solution of 84 parts (1.14 gr. mols/liter) of tricholoracetic acid, in 200 parts of benzene. The temperature is maintained at 20° C. by cooling to dissipate the heat liberated. Even under these temperature conditions a consecutive reaction occurs, causing the reaction mixture to become yellow, then brownish red, and finally after 20–25 minutes, almost black. After 30 minutes reaction, a solution of 32 parts of potassium hydroxide (proton acceptor) in 740 parts of ethanol is added. The color of the reaction mass then changes from black (or bluish-black) to yellow. Unreacted cyclopentadiene, together with about two-thirds of the solvent is removed by vacuum distillation at a temperature below 30° C. The residue containing ester product is stored for 16 hours at 20° C. to hydrolyze the ester to the alcohol. The bulk of the benzene and ethanol is thereafter distilled off, and the residue containing the "alcohol," potassium trichloroacetate and colored materials is mixed with 200 parts of a 10% aqueous solution of sodium sulphate, the mixture being thoroughly extracted with ether. The ether solution is washed with water, dried with sodium sulphate and after removal of the ether by distillation the residue is fractionately distilled at a pressure of 2 mm. mercury, the "alcohol" boiling over at 93° C. A yield of 17% based on initial cyclopentadiene is obtained.

When a solution of 7.5 parts of "alcohol" in 900 parts of benzene is mixed with 114 parts of trichloroacetic acid polymerization is complete in 240 minutes at 25° C., the solution becoming deep blue, almost black with a light absorption having two maxima at 475 and 610 m$\mu$ and a specific electrical conductance, at 25° C., of $3.0 \times 10^{-8}$ ohms$^{-1} \times$cm.$^{-1}$. Upon repetition of the above but contacting 5.3 parts of "alcohol" and 33 parts of trichloroacetic acid in 900 parts of benzene, polymerization is complete in 1200 minutes, the deep blue, almost black solution having light absorption maxima at 475 and 610 m$\mu$ and a specific electrical conductance at 25° C., of $3 \times 10^{-9}$ ohms$^{-1} \times$cm.$^{-1}$.

The ester is a liquid at room temperature. Since heating converts it into a black insoluble polymer and low molecular weight decomposition products, vacuum distillation of the ester is not useful as a purification method. Preferably the solvent is removed by prolonged vacuum distillation at a pressure below 2 cm. mercury and at a temperature below 40° C. The equivalent weight of the ester, prepared in this way, agrees within ±5% with the theoretical value of 295. The refractive index, D line, 25° C., is 1.516 and the specific gravity, 28° C., is 1.26. The ester is practically insoluble in water, forms a milky suspension with nitromethane and it is easily soluble in acetic acid, nitrobenzene, pyridine, benzene, carbon tetrachloride, chloroform, ethanol, acetone, ether, and petrolether. In carbon tetrachloride solution at 20° C., the molecular weight of the ester is 479±120. It appears that under these conditions double molecules are formed ($C_{24}H_{26}O_4Cl_6 = 591$). At 21° C., the refractive index increment of the ester in carbon tetrachloride and benzene solution is respectively 0.110±0.007 and 0.011±0.001 cm.$^3$/g. Bromination and hydrogenation tests indicate the presence of two double bonds per molecule, while the high degree of reactivity of the compound together with the observed maximum of the ultraviolet absorption spectrum at 243 m$\mu$ indicates that the double bonds are conjugated. Oxydative degradation of the ester with ozone, followed by reaction with hydrogen peroxide, or oxydative degradation with potassium permanganate in alkaline solution leads to succinic acid, no glutaric acid being detectable. Oxydative degradation of the ester with concentrated nitric acid leads to oxalic acid.

In accordance with the prior art an hydroxy-dihydrodicyclopentadiene can be prepared by hydrating endo-dicyclopentadiene (Bruson et al., J. Am. Chem. Soc., v. 67, p. 725, 1945), or by hydrolyzing the reaction product of endo-dicyclopentadiene and trichloroacetic acid. Some distinguishing characteristics of the alcohol of the present invention and that of the prior art are listed in Table I.

Table I

|  | A | B | C |
|---|---|---|---|
| Light absorption (max.) | 243 mμ | (1) | (1). |
| E (l./g. mol-cm.) [2] 243 mμ | 340 | 12 | 4. |
| M.P. of phenyl isocyanate adduct (° C.). | 64-65 | [3] 167-168 | [3] 165-166. |
| Interaction with trichloroacetic acid in carbon tetrachloride 20° C. | Deep blue coloration. | No coloration. | No coloration. |
| Odor | Unpleasant | Pleasant | Pleasant. |

A—Alcohol of present invention.
B—Alcohol by Bruson method.
C—Alcohol by hydrolyzing reaction product of endo-cyclopentadiene and trichloroacetic acid.
[1] No maximum at wave length above 212 mμ.
[2] Molar light absorption coefficient.
[3] When mixed, these derivatives exhibit no depression of the melting points.

By an "aprotic solvent" is meant one which neither yields a proton to the solute nor gains one from it. Among suitable materials are nitrobenzene, nitromethane, chlorinated benzene derivatives, chloroform and chloroethanes. The reaction occurs upon intimately mixing the two reactants in a common solvent within the concentration limits previously defined. Generally the temperature of reaction is maintained below about 30° C. to avoid polymerization of product. Operation within the limits of from about 20° C. to about 30° C. permits the reaction to progress at a convenient rate.

As pointed out previously, it is recommended that the reaction be carried out in the substantial absence of molecular oxygen. Blanketing with an inert gas such as carbon dioxide, nitrogen, solvent vapors or the like is satisfactory as is operation at low pressure as illustrated in the example. While traces of water have no effect on the reaction, substantial quantities of water will retard formation of the ester. Preferably the blanketing gas is anhydrous.

Interruption of the reaction by addition of a proton acceptor to the reaction mass is accomplished by such proton acceptors as pyridine, ammonia, alcoholic sodium or potassium hydroxide, ethylalcohol, dioxane, ether, acetone or any other solvent, whose affinity to protons is greater than the affinity of protons to cyclopentadiene. Solid proton acceptors such as potassium bicarbonate and other solid carbonates and hydroxides may also be used. If pyridine, ammonia or nitrogen containing bases are used, that part of the trichloroacetic acid which has not been converted into the ester forms a trichloroacetate, insoluble in the solvent. This insoluble, or substantially insoluble, trichloroacetate is filtered or centrifuged off. The filtrate or centrifugate containing the ester is then substantially free of trichloroacetic acid. In order to isolate the ester from this filtrate or centrifugate, the solvent, together with that part of the cyclopentadiene which has not reacted, is removed by fractional vacuum distillation. The ester can thus be prepared in almost quantitative yield. Alkaline hydrolysis of the ester produces the alcohol. Since the speed of the reaction will vary depending upon the temperature, the nature of the solvent, the concentrations of the reactants and the like, care must be exercised to avoid conversion of more than about 65% of the cyclopentadiene. For instance, in Example 1 of United States Patent 2,692,254 the polymer is isolated after a reaction time of about three hours, the yield being 90% of the cyclopentadiene used. Under the solvent, temperature and concentration conditions of that example 50% of the cyclopentadiene consumed reacts within 2 to 3 minutes. If therefore the isolation of the ester, rather than that of the colored polymer, would have been desired, the reaction should have been stopped after 2 or 3 minutes, rather than after about 3 hours. Where the speed of a particular system is unknown, this point can be detected by a slight coloration due to initiation of polymerization of the ester. The reaction can be interrupted when less than about 50% cyclopentadiene is converted without deleterious effect, but with the expected reduction in yield.

The period of the reaction during which no more than about 65% of the cyclopentadiene is consumed has been observed to correspond approximately to the period during which no more than about 10% of highly colored (acid catalyzed) polymer is formed. As discussed in Example 1 this concentration of polymer can be detected visually and by specific conductivity measurements. In addition, the time for adding proton acceptor can be approximated from theoretical considerations. Thus, assuming the reaction to produce the highly colored polymer of United States Patent 2,692,254 proceeds in two consecutive reactions producing, (1) an evanescent ester by the reaction of cyclopentadiene and trichloroacetic acid and (2) the highly colored polymer from the ester, then the rates of reactions (1) and (2) may be expressed by the differential rate equations $$dx/dt = k_1(a-2x)(b-x+y-y/n)^2$$

and $$dx/dt = k_2(x-y)(b-x+y-y/n)$$

In the equations $k_1$ and $k_2$ are overall velocity coefficients; $a$ and $b$ are the initial concentrations of cyclopentadiene and trichloroacetic acid (time, $t$, is zero); $x$ is the concentration of ester formed after time, $t$; $y$ is the concentration of the ester converted into the polymer at time, $t$; $n$ is the average degree of polymerization. As the result of kinetic measurements the numerical values of the velocity coefficients are determined. These are given in Table II. Using these values the times can be calculated when a specified quantity of cyclopentadiene is used up and it can also be calculated how much of the reacted cyclopentadiene is converted respectively into the ester and into the polymer. Results of such calculations, which relate to conditions similar to those prevailing in Example III above, are in Table III.

Table II

| Solvent | Temp. (° C.) | $10^3 k_1$ (l./mole)$^2$ ×mins.$^{-1}$ | Solvent | Temp. (° C.) | $10^3 k_2$ l./mole, mins. |
|---|---|---|---|---|---|
| CCl$_4$ | 25 | 9 | CCl$_4$ | 20 | 2.0 |
|  | 35 | 16 |  |  |  |
|  | 45 | 25 | C$_6$H$_6$ | 25 | 10 |
|  |  |  |  | 31 | 13 |
|  |  |  |  | 40 | 17 |
| C$_6$H$_6$ | 20 | 30 |  |  |  |
|  | 25 | 50 |  |  |  |
|  | 35 | 80 |  |  |  |
|  | 45 | 120 |  |  |  |

Table III

| Time (mins.) | Percent C$_5$H$_6$ Consumed | Percent of the Cyclopentadiene Used and Converted Into— | |
|---|---|---|---|
|  |  | Ester | Polymer |
| 20 | 76 | 67 | 9 |
| 40 | 91 | 73 | 18 |
| 60 | 98 | 69 | 21 |
| 80 | 100 | 62 | 38 |
| 100 | 100 | 38 | 62 |
| 180-200 | 100 | 0 | 100 |

The "ester" of the present invention is a polymerizable monomer which can be polymerized by three methods: (a) In solution, in the absence of acid, an oxygen catalyzed reaction leads to a colorless high molecular weight polymer; (b) in solution in the presence of acids, a reaction with elimination of trichloroacetic acid leads to highly colored polymers, the solution of which, in the presence of acids, are electrically conducting; (c) in the bulk phase, in the absence of solvents or acids, insoluble deeply colored polymers are formed which are useful as coatings for containers of metal or other materials. The "alcohol"

of the present invention is also a polymerizable monomer. In solution and in the presence of acid, polymers are obtained, which are similar to those prepared by method (b) from the "ester."

The "ester" and the "alcohol" of the present invention may be copolymerized with other unsaturated monomers such as isobutylene, styrene, α-methyl styrene and the like to produce linear, interpolymers with new and interesting properties. These linear polymers may be cross-linked (cured) by exposure to air.

Many equivalent modifications of the present invention will be obvious to those skilled in the art from a reading of the above without a departure from the inventive concept.

I claim:
1. A compound of the formula

wherein —R is a member of the class consisting of —H and

said compound when R is H being a hydroxy compound having a light absorption (max.) of 243 mμ, a molar light absorption coefficient of 340, and a melting point of the phenyl isocyanate adduct of 64 to 65° C., said compound when R is

being an ester having a $n_D^{25}$ 1.516, specific gravity at 28° C. of 1.26, exhibiting a deep blue coloration in carbon tetrachloride at 20° C., being insoluble in water, forming a milky suspension with nitromethane, and soluble in acetic acid, nitrobenzene, pyridine, benzene, carbon tetrachloride, chloroform, ethanol, acetone, ether, and petroleum ether.

2. A hydroxy compound of the formula

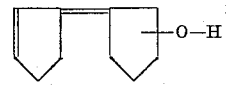

said hydroxy compound having a light absorption (max.) of 243 mμ, a molar light absorption coefficient of 340, and a melting point of the phenyl isocyanate adduct of 64 to 65° C.

3. A polymer formed by contacting the compound of claim 2 with acid.

4. An ester of the formula

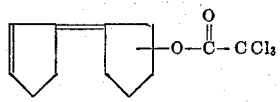

said ester having a $n_D^{25}$ 1.516, specific gravity at 28° C. of 1.26, exhibiting a deep blue coloration in carbon tetrachloride at 20° C., being insoluble in water, forming a milky suspension with nitromethane, and soluble in acetic acid, nitrobenzene, pyridine, benzene, carbon tetrachloride, chloroform, ethanol, acetone, ether, and petroleum ether.

5. A colored polymer, insoluble in both benzene and carbon tetrachloride and formed by storage of the compound of claim 4.

6. A colorless polymer formed by contacting the compound of claim 4 with molecular oxygen.

7. A process for the preparation of a compound having the formula

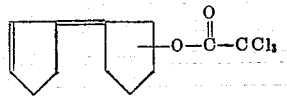

which comprises mixing cyclopentadiene with trichloroacetic acid in an organic aprotic solvent while maintaining the molarity of the reaction mixture with respect to cyclopentadiene at no greater than about 2 gram mols per liter and the initial molarity of the reaction mixture with respect to trichloroacetic acid no less than about 0.25 gram mol per liter, arresting the reaction when no more than 10% of a highly colored polymer is formed and separating said compound.

8. The process of claim 7 wherein the aprotic solvent is carbon tetrachloride.

9. The process of claim 7 wherein the aprotic solvent is benzene.

10. The process of claim 7 wherein said compound is thereafter hydrolyzed to the corresponding hydroxy compound by alkaline hydrolysis.

11. A process for the preparation of a compound having the formula

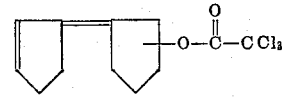

which comprises mixing cyclopentadiene with trichloroacetic acid in an organic aprotic solvent while maintaining the molarity of the reaction mixture with respect to cyclopentadiene at no greater than about 2 gram mols per liter and the initial molarity of the reaction mixture with respect to trichloroacetic acid no less than about 0.25 gram mol per liter, adding sufficient proton acceptor to the reaction mixture to remove trichloroacetic acid when no more than about 65% of the cyclopentadiene has been consumed in the reaction and separating said compound.

12. The process of claim 11 wherein the reaction mass is maintained at a temperature below about 30° C.

13. The process of claim 11 wherein the proton acceptor is pyridine.

14. The process of claim 11 wherein the proton acceptor is potassium bicarbonate.

15. The process of claim 11 wherein the proton acceptor is potassium hydroxide.

16. A process according to claim 11 including the additional step of hydrolyzing said compound to a compound having the formula

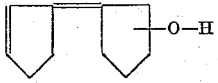

References Cited in the file of this patent
UNITED STATES PATENTS
2,692,254    Wassermann _____ Oct. 19, 1954